United States Patent
Wakita et al.

(10) Patent No.: US 6,781,759 B1
(45) Date of Patent: Aug. 24, 2004

(54) REFLECTOR, PRODUCTION METHOD THEREOF, DISPLAY ELEMENT, AND DISPLAY DEVICE

(75) Inventors: Naohide Wakita, Suita (JP); Seiji Nishiyama, Hirakata (JP); Mariko Kawaguri, Moriguchi (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/110,974

(22) PCT Filed: Oct. 23, 2000

(86) PCT No.: PCT/JP00/07377

§ 371 (c)(1),
(2), (4) Date: Apr. 18, 2002

(87) PCT Pub. No.: WO01/29585

PCT Pub. Date: Apr. 26, 2001

(30) Foreign Application Priority Data

Oct. 21, 1999  (JP) .......................... 11-299650

(51) Int. Cl.⁷ .......................... G02B 5/02; G02F 1/1335
(52) U.S. Cl. .......................... 359/599; 359/627; 349/113
(58) Field of Search .......................... 349/113; 359/599, 359/627, 850, 851; 362/348

(56) References Cited

U.S. PATENT DOCUMENTS

| | | | | |
|---|---|---|---|---|
| 4,040,830 A | * | 8/1977 | Rogers ........................ | 430/212 |
| 4,353,977 A | * | 10/1982 | Gerber et al. ................ | 430/256 |
| 5,245,454 A | * | 9/1993 | Blonder ....................... | 349/113 |
| 5,936,688 A | | 8/1999 | Tsuda et al. ................ | 349/113 |
| 5,949,507 A | * | 9/1999 | Shimada et al. ............ | 349/113 |
| 6,233,031 B1 | | 5/2001 | Ishitaka ....................... | 349/113 |
| 6,407,784 B1 | * | 6/2002 | Kanou et al. ................ | 349/113 |
| 6,421,106 B1 | * | 7/2002 | Takatsuka et al. .......... | 349/113 |
| 6,429,919 B1 | | 8/2002 | Takatsuka et al. .......... | 349/113 |

FOREIGN PATENT DOCUMENTS

| | | |
|---|---|---|
| CN | 1191327 A | 8/1998 |
| CN | 1209566 A | 3/1999 |
| EP | 0 495 679 A | 7/1992 |
| EP | 0 883 015 A | 12/1998 |
| JP | 04-243226 | 8/1992 |
| JP | 06-027481 | 2/1994 |
| JP | 09-197399 | 7/1997 |
| JP | 9-292504 | 11/1997 |
| JP | 10-123508 A | 5/1998 |
| JP | 11-190803 | 7/1999 |
| JP | 11-237625 | 8/1999 |
| JP | 11-242105 | 9/1999 |
| JP | 2000-321568 | 11/2000 |

\* cited by examiner

*Primary Examiner*—John Juba, Jr.
(74) *Attorney, Agent, or Firm*—Parkhurst & Wendel, L.L.P.

(57) ABSTRACT

In a reflector comprising a reflecting film formed on a surface having depressions and protrusions, wherein each of the depressions and protrusions has a vertex and is composed of a curved surface formed so as to be convex up or convex down and a surrounding portion including a valley or a ridge surrounding the curved surface with an inflection point of the curved surface serving as a boundary between the curved surface and the surrounding portion; and wherein when the curved surface is convex up, the inflection point is on the valley side of the midpoint between the vertex and the valley, whereas when the curved surface is convex down, the inflection point is on the ridge side of the midpoint between the vertex and the ridge.

12 Claims, 16 Drawing Sheets

Cross-Sectional Shape

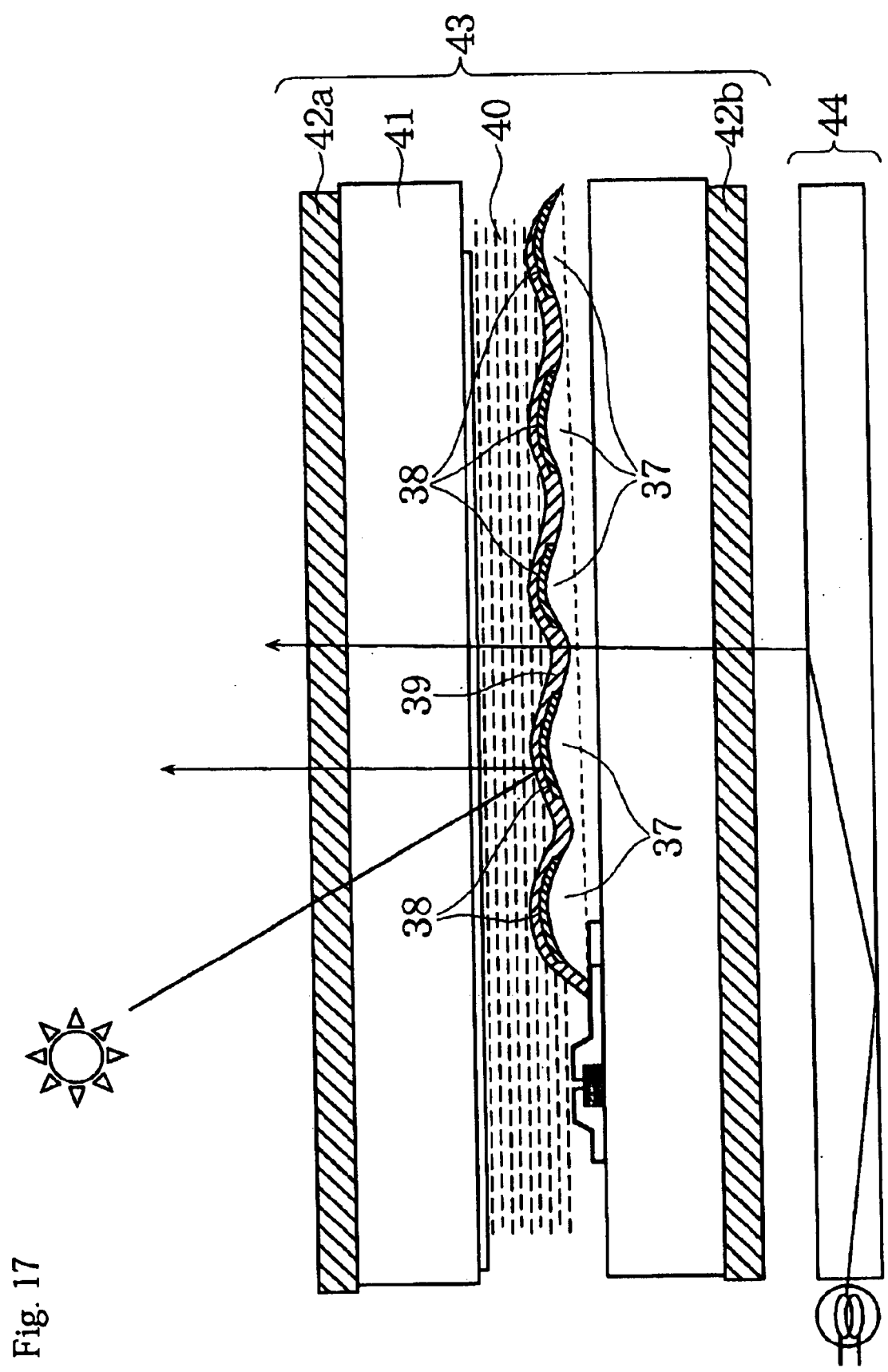

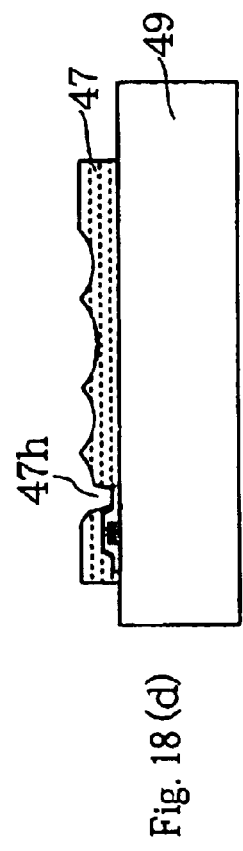
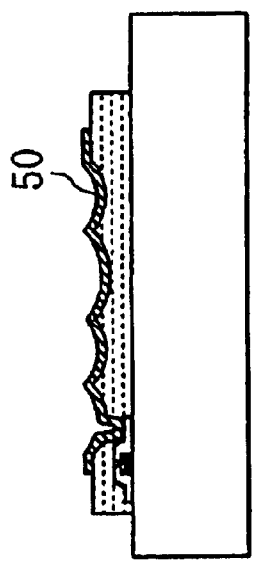
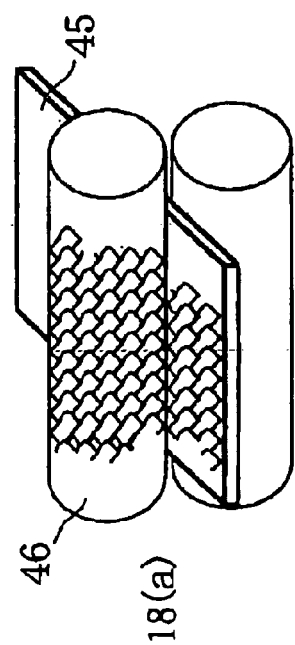
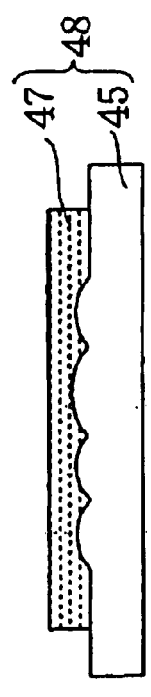
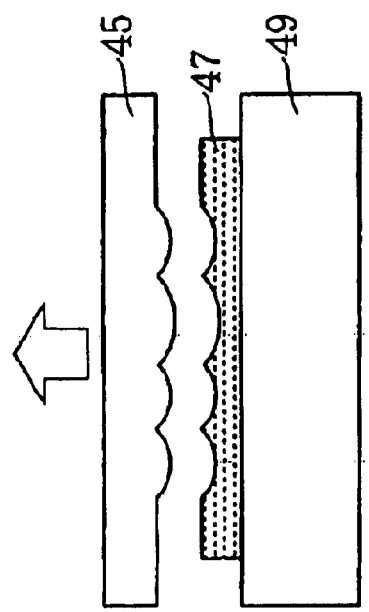
Fig. 18(a)
Fig. 18(b)
Fig. 18(c)
Fig. 18(d)
Fig. 18(e)

Fig. 19 (a) Prior Art
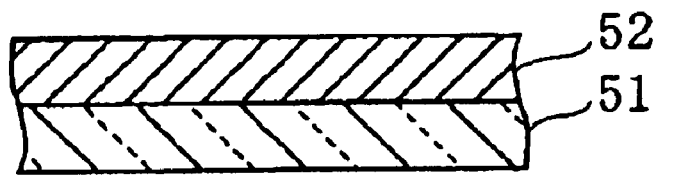
Ultraviolet Light
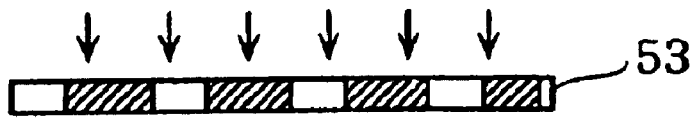
Fig. 19(b) Prior Art
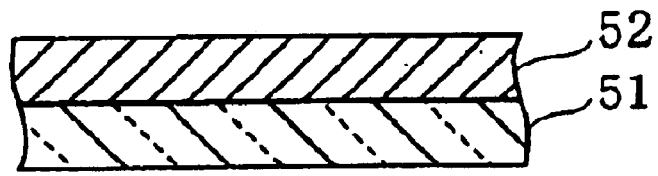
Fig. 19(c) Prior Art
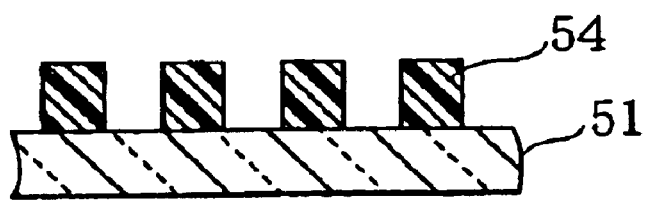
Fig. 19(d) Prior Art
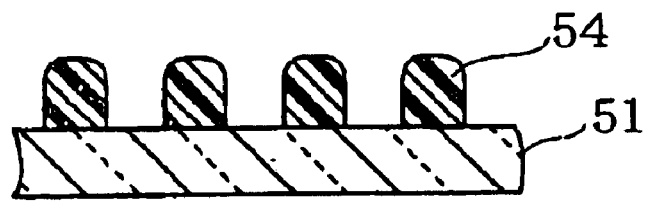
Fig. 19(e) Prior Art
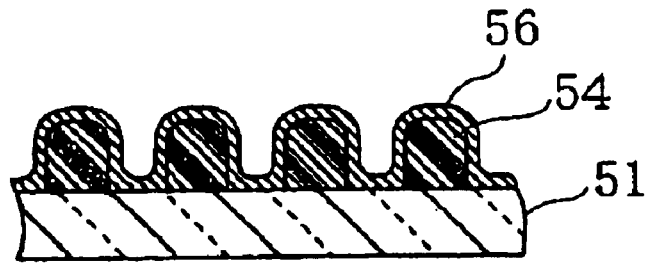

REFLECTOR, PRODUCTION METHOD THEREOF, DISPLAY ELEMENT, AND DISPLAY DEVICE

TECHNICAL FIELD

The present invention relates to a reflector, a production method thereof, a display element, and a display device, and more particularly, to a reflective display element and a reflective display device in which a non-emissive light modulating layer is employed.

BACKGROUND ART

A liquid crystal display, which is a typical example of a non-emissive display element, is categorized into a transmissive liquid crystal display in which a backlight is disposed at the back and a reflective liquid crystal display in which a reflector is disposed at the back to utilize external light for illumination. However, the reflective liquid crystal element is advantageous in that a liquid crystal can be driven at a low voltage of a few volts, and thus operation is realized with extremely low power consumption. In the case of the reflective liquid crystal element, a diffuse reflector made of aluminum or silver is disposed behind the liquid crystal layer, while in the case of a black-and-white reflective liquid crystal incorporated into, for example, a watch, configuration is such that a diffuse reflector having a polarizer is attached to the outside of the glass.

In Japanese Unexamined Patent Publication No. 4-243226, in order to fabricate a diffuse reflector whose shape can be controlled with good reproducibility on the inner surface of the glass, a diffuse reflecting film is fabricated as follows. As shown in FIG. 19, a resist film 52 is coated on a glass substrate 51 and is exposed to light exposure through a photomask 53, and after a plurality of protrusions 54 spaced apart from one another are formed, the edges of each protrusion are rounded by performing a heat treatment, and then over the structure, a metal reflecting film 56 is formed.

In Japanese Unexamined Patent Publication No. 6-27481, in order to prevent interference colors from being generated by flat portions that are not patterned as disclosed in the above-mentioned Japanese Unexamined Patent Publication No. 4-243226, protrusions 60 are coated with a polymeric resin 61 to form smooth and continuous depressions and protrusions as shown in FIG. 20.

Sugiura et al. propose a window type scattering characteristic such that the intensity of reflected light is constant within a certain angle range (see solid line 62 in FIG. 21) as a scattering characteristic that realizes higher brightness in a wide viewing angle range, and as a shape capable of realizing such a scattering characteristic, Sugiura et al. propose a method whereby a continuous curved surface 65 is formed such that convex-down quadratic functions 63 and convex-up quadratic functions 64 are joined together as shown in FIG. 22 (see, for example, AM-LCD '95, Digest of Technical Papers, pages 153–156, Norio Sugiura and Tatuso Uchida, August 1995).

However, with the prior art reflectors in which a reflecting film is provided on the protrusions spaced apart from one another or is provided on the continuous curved surface formed by leveling off the protrusions spaced apart from one another with a resin (as shown in FIG. 20), the reflected light intensity is highest in the directions of specular reflection and the exit angle dependency is high. This creates problems for the reflection characteristics, for example, display may appear metallic. Although the window type scattering characteristic may make a preferable countermeasure for these problems, the continuous curved surface defined by quadratic functions (those shown in FIG. 22) proposed by Sugiura et al. are defined two-dimensionally as is understood from the equation, and the scattering direction is limited to one direction. Therefore, scattering does not occur with respect to light entering from a direction orthogonal to this direction, and thus the continuous curved surface offers no practical use. Consequently, at the present, a window type scattering characteristic with a small amount of direction dependency is yet to be realized, and a three-dimensional shape for a reflector having depressions and protrusions that show such characteristics is desired.

DISCLOSURE OF THE INVENTION

In view of the foregoing problems, it is one of the objects of the present invention to realize a window type scattering characteristic with a small amount of direction dependency by improving a reflector and to provide a display element and a display device in which bright displays with a wide range of viewing angles as well as paper white displays free from sense of metallicity are possible.

It is another object of the present invention to provide a method of easily producing the aforementioned reflector, display element, and display device.

In order to solve the foregoing problems, in a first reflector of the present invention comprising a reflecting film formed on a surface having depressions and protrusions, each of the depressions and protrusions has a vertex and is composed of a curved surface formed so as to be convex up or convex down and a surrounding portion including a valley or a ridge surrounding the curved surface with an inflection point of the curved surface serving as a boundary between the curved surface and the surrounding portion, and when the curved surface is convex up, the inflection point is on the valley side of the midpoint between the vertex and the valley, whereas when the curved surface is convex down, the inflection point is on the ridge side of the midpoint between the vertex and the ridge.

Preferably, when cross-sectional shapes of the curved surfaces are made similar by defining the cross-sectional shapes by $z=\alpha x^{a/2}+\beta$, where z is the thickness direction, x is the horizontal direction, and $\alpha$ and $\beta$ are constants, the average value of "a" for the protrusions is fixed to be greater than 2 and equal to or less than 4.

By using a reflector having such a configuration, it is possible to realize a window type scattering characteristic with a small amount of direction dependency, thereby enabling the provision of bright displays with a wide viewing angle In addition, it is preferable that each curved surface of such a reflector have a width two or more times the width of the surrounding portion.

Furthermore, by making the average value of "a" greater than 2 and equal to or less than 3 and the intensity of reflected light that is reflected by the reflector such that light in a direction of specular reflection of incident light has a higher intensity than diffusely reflected light in a direction of scattering of incident light at a specified reflection angle, it is possible to realize an unprecedented reflection characteristic such that the viewing angle direction is even brighter than the specular reflection direction.

Additionally, when adjacent convex up or convex down curved surfaces are close to one another and there are substantially no surrounding portions, specular reflected light is suppressed more, and thus easily viewable displays can be obtained. It is especially easy to produce a shape such that the shape having depressions and protrusions comprises only either convex up or convex down and the sign of the slope of inclined surfaces of adjacent protrusions is reversed at every boundary between the depressions or protrusions In a second reflector of the present invention having a reflecting film formed on a surface with a plurality of depressions and protrusions made up of a continuous curved surface, when cross-sectional shapes having vertexes of the depressions or the protrusions as origins are made similar by defining the cross-sectional shapes by $z=\alpha x^{a/2}+\beta$, where z is the thickness direction, x is the horizontal direction, and $\alpha$ and $\beta$ are constants, the average value of "a" for the plurality of depressions and protrusions is fixed to be greater than 2.5 and less than 3.5.

In a display element and a display device incorporating a reflector such as the above-described second reflector, it is possible to provide bright displays with a wide viewing angle at low power consumption, as is the case with the first reflector.

Furthermore, a liquid crystal display element of the present invention comprises a substrate and a liquid crystal layer, the substrate having a plurality of convex-up or convex-down curved surfaces each having a vertex, a reflecting film on the convex curved surfaces, and no reflecting film on surrounding portions surrounding the convex curved surfaces, wherein when cross-sectional shapes having vertexes of the convex curved surfaces as origins are made similar by defining the cross-sectional shapes by $z=\alpha x^{a/2}+\beta$, where z is the thickness direction, x is the horizontal direction, and $\alpha$ and $\beta$ are constants, the average value of "a" for the plurality of protrusions or depressions is fixed to be greater than 2 and equal to or less than 4. With such a liquid crystal display element, it is possible to realize a transflective liquid crystal display element having the characteristic of the first or second reflector described above.

A method of producing a reflector of the present invention comprises the steps of forming first protrusions or depressions on a substrate surface, forming second protrusions or depressions by performing exposure with a photomask and development on portions where the first protrusions or depressions are not present, and forming a reflecting film on the second protrusions or depressions.

By using the method, it is possible to produce the above-mentioned reflector.

A second method of producing a reflector of the present invention comprises the steps of forming a plurality of depressions each having a curved-like surface and being separated from one another on at least a portion of a substrate surface having pixel portions, and widening the diameter of each of the plurality of depressions until adjacent depressions are close to one another by substantially isotropically etching the substrate surface.

By using the method, it is possible to produce the above-mentioned reflector with few steps.

A third method of producing a reflector of the present invention comprises the steps forming a photoresist film having a plurality of holes on at least a portion of a substrate surface having pixel portions by photolithography, and by substantially isotropically etching the substrate surface, forming depressions with a larger diameter than the holes in the holes on the substrate surface, so that a plurality of depressions adjacent to one another are made dose.

By using the method, it is possible to easily produce the above-mentioned reflector.

In addition, a resin film of the present invention is such that a photosensitive resin layer is coated on a base film having a surface with a plurality of protrusions or depressions each having a curved-like surface.

By using the resin film, the formation of a reflector having depressions and protrusions on the substrate surface of a display element is facilitated.

In order that the above-mentioned depressions and protrusions be suitable for a diffuse reflector, it is preferable that white scattering be caused by the protrusions or depressions when the average value for the maximum inclination angle of each of the plurality of protrusions or depressions having a curved-like surface is not less than 2° and not more than 15°, and more preferably, not less than 4° and not more than 11°.

Each of the protrusions or depressions is composed of a convex up or convex down curved surface having a vertex and a surrounding portion including a ridge or a valley surrounding the curved surface with an inflection point of the curved surface serving as a boundary between the curved surface and the surrounding portion, and wherein when the curved surface is convex up, the inflection point is on the valley side of the midpoint between the vertex point and the valley, whereas when the curved surface is convex down, the inflection point is on the ridge side of the midpoint between the vertex and the peak. Or, when cross-sectional shapes having vertexes of the depressions or the protrusions as origins are made similar by defining the cross-sectional shapes by $z=\alpha x^{a/2}+\beta$, where z is the thickness direction, x is the horizontal direction, and $\alpha$ and $\beta$ are constants, the average value of "a" for the plurality of depressions and protrusions is fixed to be greater than 2 and less than 4. This way, the characteristic of the first reflector of the present invention is realized.

A resin film of the present invention is easily produced by using a method comprising the steps of forming a plurality of protrusions or depressions each having a curved-like surface in a surface of a base film with a molding tool, and coating a photosensitive resin layer on the base film.

Further, by a method of producing a reflector in which by laminating on a substrate a reflecting film fabricated such that a resin film in which a photosensitive resin layer is coated on a base film that has a surface with a plurality of protrusions or depressions each having a curved-like surface, and by transferring the photosensitive resin film that has a surface with a plurality of depressions and protrusions onto the substrate, to form a reflecting film on the photosensitive resin layer, it is possible to produce a reflector using a resin film of the present invention with a simple manufacturing process, thereby making it possible to reduce losses arising from process defects.

In particular, by a method of producing a reflector in which a substrate has TFT devices and after a photosensitive resin is transferred, contact holes are formed in the photosensitive resin above output terminals of the TFT devices, the advantageous effect of a reduction in losses is great.

BRIEF DESCRIPTION OF THE DRAWINGS

FIG. 17 is a cross-sectional view of a transflective liquid crystal display element of the present invention.

FIG. 18(a)–FIG. 18(e) are views showing the steps of a method of producing a resin film and a reflector of the present invention.

FIG. 19(a)–FIG. 19(e) are views showing the steps of a method of producing a prior-art reflector.

BEST MODE FOR CARRYING OUT THE INVENTION

Embodiment 1

EXAMPLE

Figure 1:
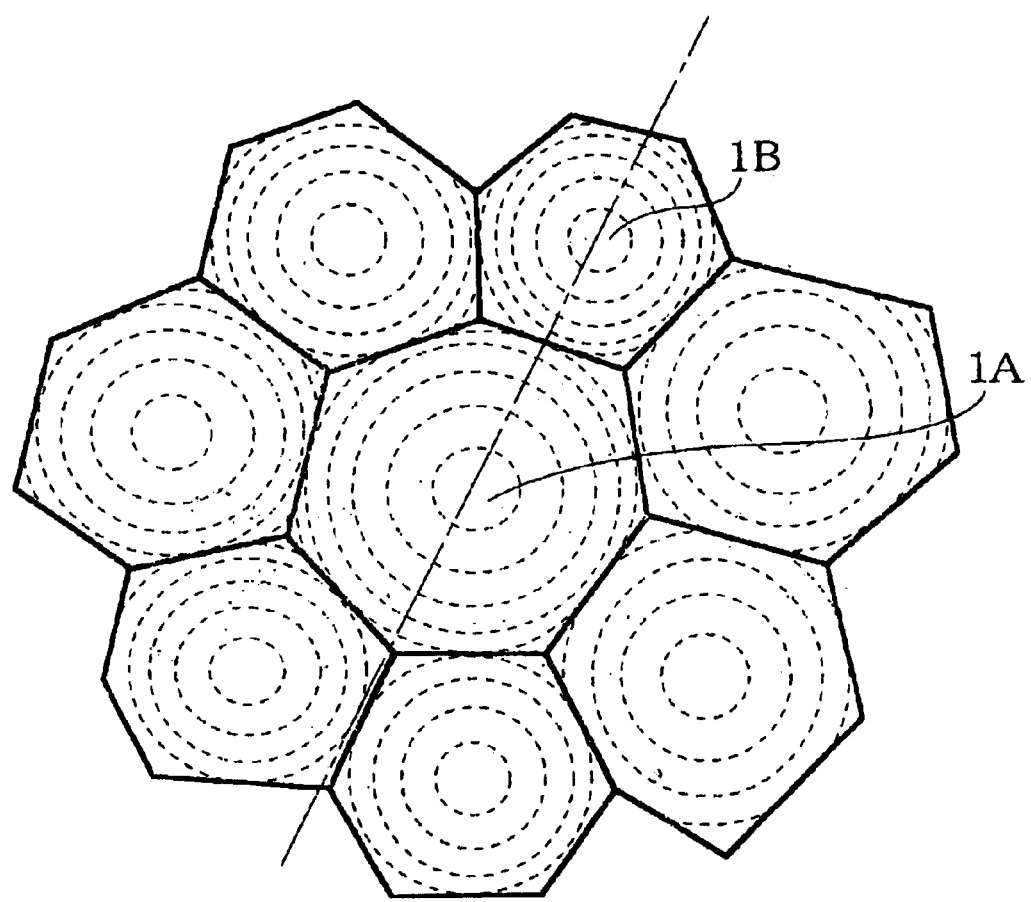
FIG. 1 is a plan view of a reflector of the present invention.
Figure 2:
FIG. 2 is a cross-sectional view of a reflector of the present invention.

Embodiment 1 of the present invention is described with reference to FIG. 1 to FIG. 5. FIG. 1 is a plan view showing the surface of a reflector of the present invention. The reflector is configured such that a plurality of depressions are close to one another. In FIG. 1, solid lines indicate boundaries between the depressions, and dashed lines indicate contour lines. FIG. 2 is a cross-sectional view of FIG. 1 taken along the chain line indicated.

As is obvious from the figures, each depression is cone-like and has a substantially quadratic surface. Specifically, the surface shape of each depression can be expressed by the following Equation 1, where the z axis is in the vertical direction, the x and y axes are within the substrate plane, and the origin is on the bottom of the cone like depression (the vertex).

$$z = \alpha(x^2 y^2) + \beta \quad \text{(Equation 1)}$$

A cross-sectional shape of the surface shape is expressed by Equation 2 described below (in Equation 1, y=0). It should be noted that the average value of the "a" in Equation 2 for a large number of the depressions is 4.

$$z = \alpha x^{a/2} + \beta \quad \text{(Equation 2)}$$

Note that in both Equations 1 and 2, reference characters α and β denote constants. The value of α varies according to the diameter or the depth of each depression, and the value of β indicates the height of the bottom, the origin of each depression. The depth, diameter, and positioning of the depressions are made irregular in order to avoid coloring caused by diffraction effects and to generate white light scattering, and therefore while the constants α and β are variable, the degree of Equation 2 is relatively stable. Note that the average value of the degree (the average value of a/2 in Equation 2) is an average value determined by curvefitting a cross section of each depression.

In addition, since the diameter of each depression must be smaller than at least the pixel size, it is preferable that the diameter of each depression be 50 μm or less. It is preferable, however, that the diameter of each depression be at least 3 μm because when the diameter of each depression is made too small, the problems of an intensifying in coloring caused by diffraction and a decreasing process margin arise.

As is clear from FIG. 2, a middle recession 1A with a large diameter is made deep and a right depression 1B is made shallow, and angles of inclination formed at the boundary portion between the depressions, where inclination is steepest, are made to be approximately 11 degrees. This makes the depressions substantially similar to one another in shape. Furthermore, by fixing the inclination angles formed at boundary portions, where inclination is steepest, in the above-described manner, for example, at the boundary between the depression 1A and the depression 1B, by fixing the inclination angle in a direction increasing to the right to be 11 degrees and the inclination angle in a direction decreasing to the right to be 11 degrees, the slopes of the depressions are discontinuous and the sign of slope reverses back and forth.

Comparative Example

Figure 3:
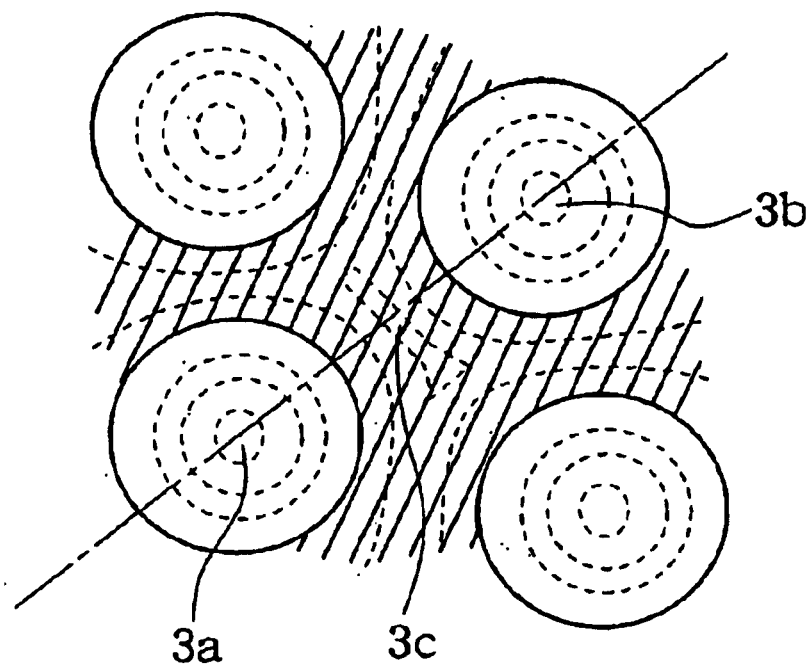
FIG. 3 is a plan view of a prior-art reflector.
Figure 4:
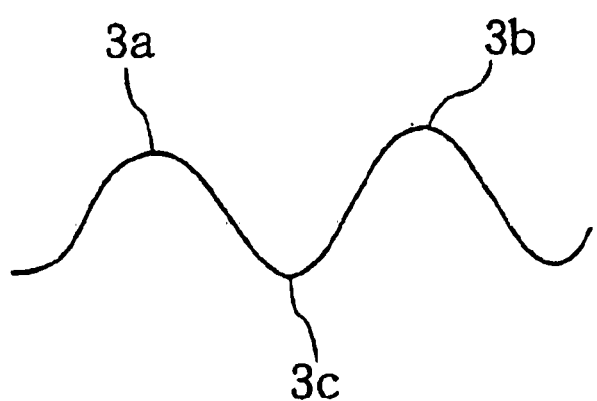
FIG. 4 is a cross-sectional view of a prior-art reflector.

A comparative example was prepared following Japanese Unexamined Patent Publication No. 6-27481 that was previously mentioned in Background Art, and it is illustrated in FIG. 3 and FIG. 4. FIG. 3 is a plan view and FIG. 4 is a cross-sectional view taken along the chain line of FIG. 3. As is obvious from FIG. 4, in a reflector of the comparative example, there is formed a continuous curved line, and the continuous curved line has a configuration approximate to the shape of convex-up and convex-down quadratic functions joined together.

Experiment 1

Figure 5:
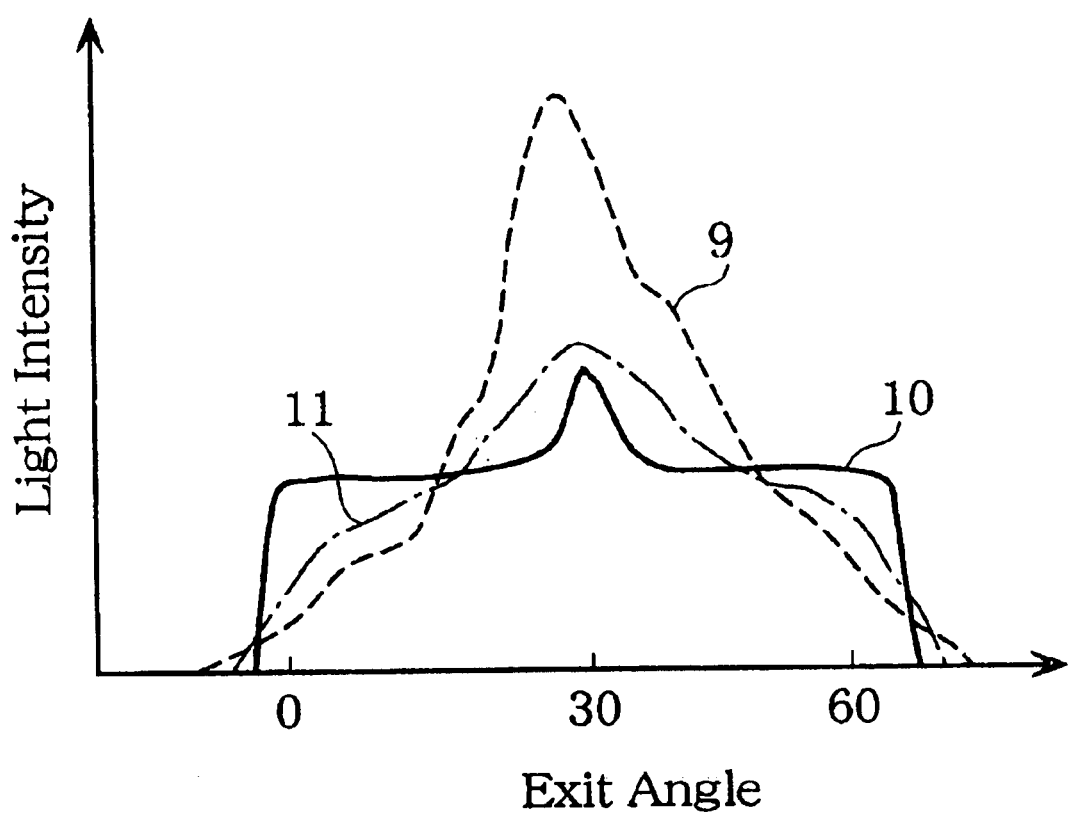
FIG. 5 is a graph illustrating the scattering characteristics of reflectors.

An aluminum reflecting film was deposited to a thickness of 200 nm over the quadratic surfaces of the present invention having discontinuous boundaries shown in FIG. 1 and over the continuous curved surface of the prior art shown in FIG. 3, respectively, to form reflectors. Then with a liquid crystal sandwiched between the substrate and a counter substrate, the respective diffuse reflection characteristics were measured and the results are shown in FIG. 5. FIG. 5 shows the measured exit angle dependency of reflected light when a light beam was projected at an angle of minus 30 degrees from a direction normal to the substrate. In FIG. 5, the exit angle is plotted on the horizontal axis and light intensity is plotted on the vertical axis.

As is clear from FIG. 5, a characteristic curve 10 of the reflector of the present invention shows a window type characteristic such that light intensity is substantially constant when exit angle is in the range of 30± approximately 35 degrees. This is due to the fact that the maximum inclination angle formed at each depression corresponds to the scattering angle of diffuse reflection, and thus, by ensuring that the maximum inclination angles are uniformly about 11 degrees, the brightness rapidly increases when the scattering angles are in the range of 35 degrees or less.

By contrast, a characteristic curve 9 of the conventional continuous curved surface shows a triangle type characteristic such that the highest intensity is zero when exit angle is 30±about 40 degrees, and the highest light intensity is observed in the direction of specular reflection. Reflective panels, when actually viewed, are generally viewed from an angle about 25 degrees to 35 degrees from the specular reflection direction, because viewability deteriorates at angles near specular reflection as a result of reflection of light. Therefore, in FIG. 5, the display brightness is mostly determined by light intensity in the vicinity of the front panel where the exit angles are from about −5 degrees to 5 degrees. As is understood from FIG. 5, it has been proved that the reflector and the reflective liquid crystal display element of the present invention are capable of realizing bright displays with a wider range of viewing angles Including the range where the exit angles are −5 degrees to 5 degrees) than have been achieved in the past Further, there was no dependency on the direction of incident light.

Because the greater the scattering angle the more light is diffused and intensity weakened, the window type characteristic cannot be realized unless the area of the inclined surfaces having steep inclinations is made larger with increase in the inclination angle. However, because the prior art reflector of FIG. 3 comprises shapes that have substantially quadratic surfaces, flat portions where the inclination is gentle occupy a large area including not only the vertexes of the protrusions but also the valley bottom portions (the hatched portions) formed at the foot of each protrusion surrounding the protrusions, and thus the area of the flat portions is larger than the area of the inclined surfaces having steep inclinations. As a result, the closer the reflected light intensity is to the specular reflection angle as shown in the characteristic curve 9, the more light intensity increases.

In view of the above, the inventors of the present invention, recognizing that the proposal made by Sugiura et al. of depressions or protrusions that are quadratic surfaces is insufficient, discovered that it is necessary to make the flat portions of the foot portions surrounding the depressions or the protrusions as small as possible in order to realize the window type characteristic. Consequently, the inventors of the present invention adopted a configuration such that depressions or protrusions each having a quadratic surface are dose to one another and, for example as shown in FIGS. 1 and 2, the inclinations at the boundary portions are discontinuous. This configuration made it possible to produce a reflector with a wide viewing angle and high brightness.

It is to be noted that although it is necessary that there be a degree of disorder in the size or position of each of the depressions or protrusions in order to prevent colors caused by diffraction, as in the present embodiment, even if the size varies, the depressions or protrusions (quadratic surfaces) are preferred to have substantially uniform maximum inclination angles because a characteristic that is more similar to the window type characteristic results.

However, in the case of curved surfaces having a degree lower than two, as long as curved surfaces have a degree equal to or less than two and greater than 1, which forms a linear line, it is possible to realize a similar characteristic. This will be explained in the following Experiment 2.

Experiment 2

Figure 6:
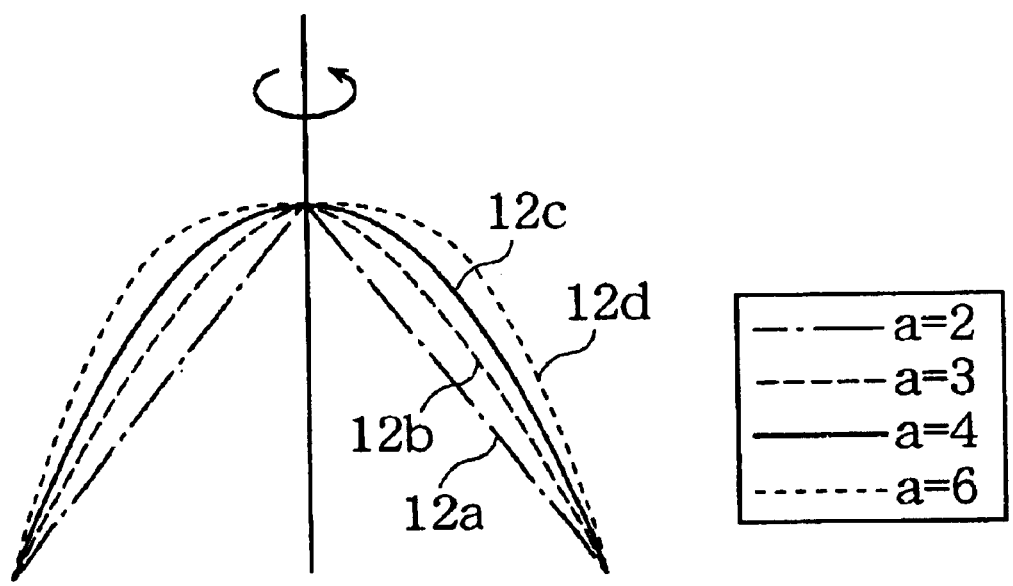
FIG. 6 is a cross-sectional view showing the shape models of reflectors.

Taking a convex shape having a cross-sectional shape that is a curve defined by Equation 2 and comprising a solid of revolution formed by rotating such a cross-sectional shape about its vertex, cross-sectional shapes of convex shapes when the degree of Equation 2 is changed by substituting "a" with 2, 3, 4, and 6, respectively, were simulated, and the results are shown in FIG. 6. Note that in FIG. 6, curves obtained when a=2, 3, 4, and 6 are represented by curves 12a, 12b, 12c, and 12d, respectively.

Figure 7:
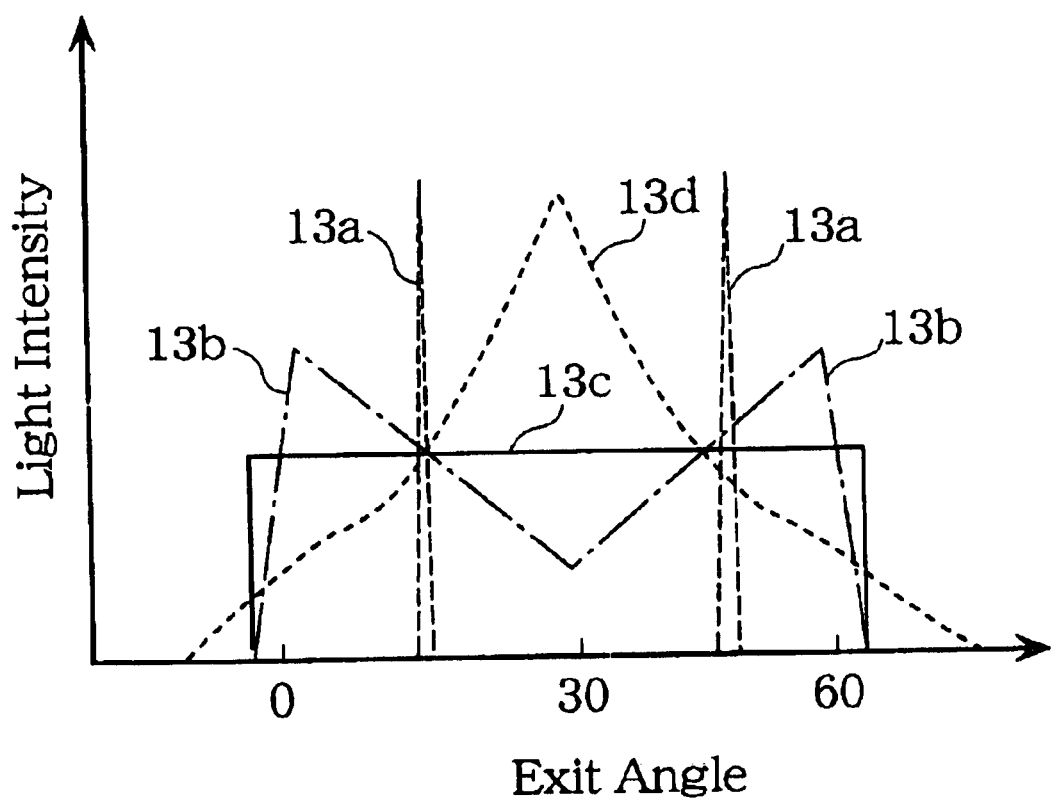
FIG. 7 is a graph illustrating the characteristics of reflectors obtained from simulation.

In addition, a reflecting film was formed on these protrusions, and the results of calculating diffuse reflection characteristics obtained when light was projected at an angle of 30 degrees as with the above-described Experiment 1 were shown qualitatively in the graph showing the characteristics of FIG. 7. Note that in FIG. 7, reference characters 13a, 13b, 13c, and 13d correspond to the above-mentioned curves 12a, 12b, 12c, and 12d.

As is clear from these figures, when a=4 in Equation 2 (that is, in the case of a quadratic surface), a window type scattering characteristic like that of the solid line 13c is obtained. When a=3, the obtained shape is like that of the broken line 13b indicating that the reflection is stronger in the scattering direction than in the specular direction, and it was revealed that an unprecedented characteristic such that the viewing angle direction is even brighter than it is in the case of the window type scattering characteristic is obtained. On the other hand, when a=2, a cone having an inclined surface defined by linear lines is obtained, and thus a characteristic such as that of the dashed line 13a indicating that reflection occurs only in the direction of a specific polar angle results. When a=6, it was revealed that a characteristic similar to the conventional scattering characteristic that shows a stronger reflection in the specular direction, such as that of 13d, is obtained.

The above-described calculated results were obtained from light reflected off one convex shape. It has been discovered, however, that in the case of a reflector surface having a plurality of protrusions formed thereon, the characteristic can be roughly determined by summing the characteristics of each convex shape (there may be slight difference depending on diffraction effects). Hence, when a reflector surface has formed thereon a plurality of protrusions that are similar to one another in shape, it is possible to obtain a characteristic similar to the one obtained in this experiment, whereas when a reflector surface has formed thereon a variety of shapes having differing slopes, a different characteristic is obtained. For example, when the reflector surface has a shape capable of achieving the peak-like reflection characteristic 13a obtained when a=2, the same characteristic as that when a=4 may be obtained by employing a distribution such that with inclination angle of a plurality of protrusions within the range of the window type characteristic, the number of protrusions is increased as the degree of inclination angle increases. Even when a=3, distribution control makes it possible to obtain the same outcome. On the contrary, when the reflector is composed of curved surfaces with a degree obtained when a=6, it is theoretically impossible to achieve a window type characteristic such as the one obtained when a=4 when the degree is small. Thus, a curved surface having a degree greater than two results in the conventional scattering characteristic of strong specular reflection and is not preferable; therefore, a cross-sectional shape such that a degree greater than that obtained when a=2 and equal to or less than that obtained when a=4 is preferred.

It should be noted that the convex shape is not necessarily limited to a solid of revolution and many variations are possible as long as the cross section is a curved surface with a degree of two or less, a pyramid having several sides and a curved surface-like cross section being acceptable.

Method of Fabricating Reflectors

The reflector illustrated in FIG. 1 was manufactured in the following manner, which is explained with reference to FIG. 8.

Firstly, as shown in FIG. 8(a), on a substrate 20 having a SiNx film 19 with a thickness of 600 nm deposited thereon, an acrylic positive resist 21 was coated to a thickness of 4 μm and subsequently holes 22 each having a diameter of 3–5 μm were photolithographically formed (at average intervals of approximately 3 μm) so as to leave a remainder film 23 having a thickness of about 0.5 μm under the holes 22. Then by heating the substrate 20 at 130° C. for ten minutes using a hotplate, smooth depressions and protrusions 24 as shown in FIG. 8(b) were formed. Reactive ion etching was performed, using a mixed gas of 75% $CF_4$ and 25% $O_2$, on the surface of the substrate. In this case, the positive resist 21 and the SiNx film 19 were etched at an etching rate of about 5 to 1. The etching was stopped when half of the positive resist film 21 remained as shown in FIG. 8(c), and then the positive resist film 21 was removed. Thus, only depressions 25 remained as shown in FIG. 8(d). Subsequently, the SiNx film 19 was isotropically etched by plasma etching using a mixed gas of 90% $CF_4$ and 10% $O_2$. This caused the diameter of the holes 25 to widen, and thereby the edges of adjacent depressions to contact one another as shown in FIG. 8(e). In this manner, a reflector having the shape illustrated in a plan view of FIG. 1 was manufactured.

Figure 9A:
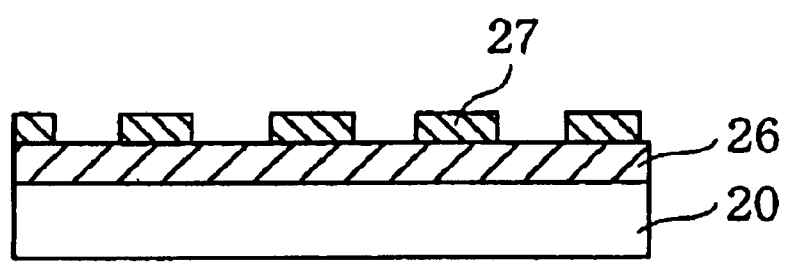
FIG. 9(a) and FIG. 9(b) are views showing the steps of a method of producing a reflector of the present invention.
Figure 9B:
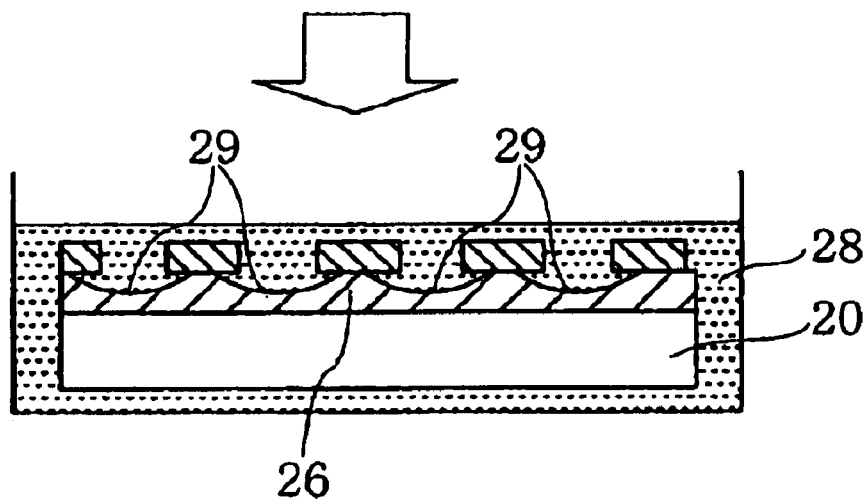

The production method is not limited to the above-described one and, for example, the production method illustrated in FIG. 9 is acceptable. That is, as shown in FIG. 9(a), on a substrate 20 on which an Al film 26 is deposited to a thickness of 600 nm, a plurality of holes each having a diameter of 2 μm were photolithographically formed to an average pitch of 4 μm in a novolak type regular positive resist 27. Then as shown in FIG. 9(b), when the aluminum was removed by wet etching in an aluminum etchant 28 in which phosphoric acid, acetic acid, nitric acid, and water were mixed, the etchant entered portions underneath the resist at the periphery of each hole and etching progressed. As a result, a shape similar to the one of FIG. 1 in which adjacent depressions 29 are in contact with one another was formed on the Al film 26. Even with this film having depressions and protrusions, a similar window type characteristic was realized. However, there was non-uniformity in the substrate surface.

Supplementary Remarks (1) In Embodiment 1 described above, the substrate surface is filled with depressions that are close to one another, but the substrate surface may be composed of only protrusions, rather than depressions, or may be composed of both depressions and protrusions. Portions that must be filled with only either depressions or protrusions are only the pixel portions, and such a configuration is not required for portions peripheral to the pixels and the contact hole portions of the array.

Figure 10:
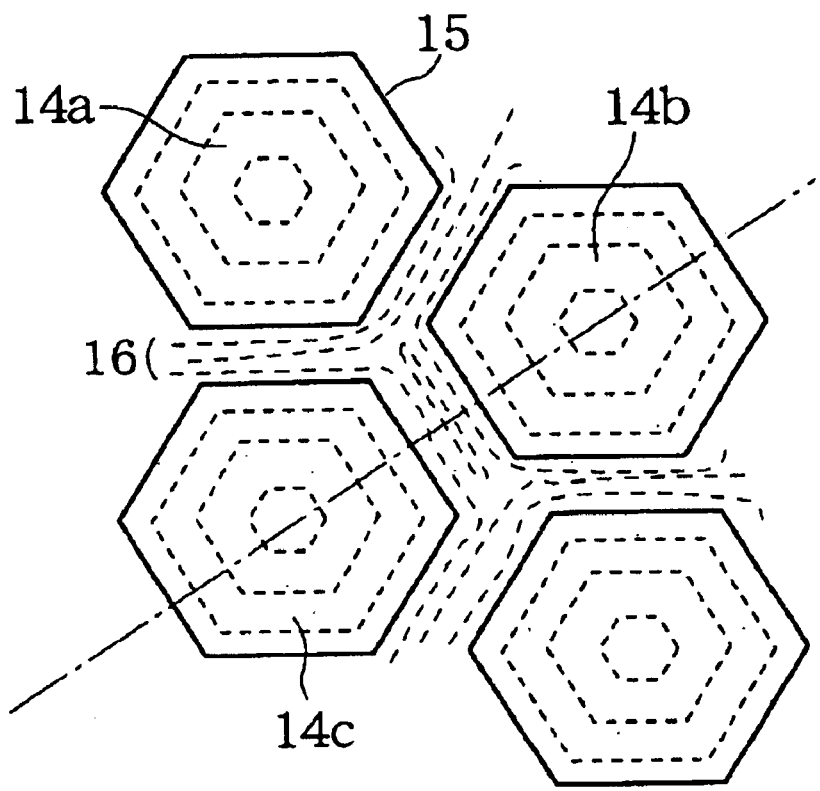
FIG. 10 is a plan view of a reflector of the present invention.
Figure 11:
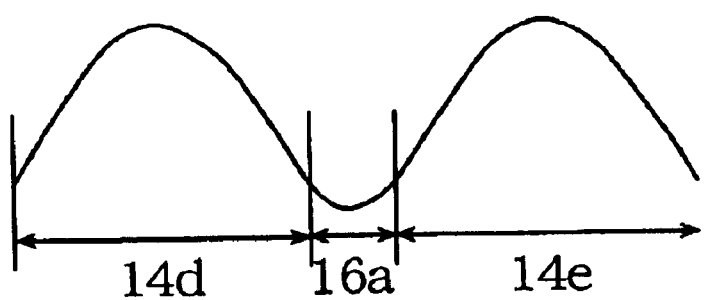
FIG. 11 is a cross-sectional view of a reflector of the present invention.

(2) As has been mentioned above, a shape such that inclination is completely discontinuous is the most preferable, but the shape is not limited to this and as long as the shape is such that the portions having a gentle inclination at the foot of each protrusion are smaller than those of conventional continuous quadratic surfaces, a better reflection characteristic is obtained compared with that of the continuous quadratic surfaces. For instance, when as shown by the contour lines of FIG. 10, the reflector shape comprises vertexes, curved surfaces of 14a, 14b, and 14c (the curved surfaces may be depressions, though not illustrated), and a surrounding portion 15 composed of valleys (ridges) surrounding each curved surface with an inflection point of a curved surface 15 serving as a boundary, unlike with conventional continuous quadratic surfaces where the difference between the width of the curved surface of each protrusion and that of the surrounding portion was little, the width 14d and 14e of the protrusions 14b and 14c are so fixed as to be wider than the width 16a of the surrounding portion 16 as illustrated in FIG. 11. In other words, when the inflection points serving as boundaries are so arranged as to be closer to the valley sides than the vertexes, the diffuse reflection angle dependency is improved more than has been achieved in the past. Preferably, the width 14d and 14e of the protrusions 14b and 14c are at least twice the width 16a of the surrounding portion 16. This way, the resulting diffuse reflection characteristic curve showed the diffuse reflection characteristic of FIG. 5, which is substantially similar to the window type characteristic 10, and therefore, it was possible to achieve displays having high whiteness with a little angle dependency. When such a reflector is applied to a non-emissive display element such as a liquid crystal display or an electrochromic display, it is possible to realize bright displays having high whiteness with a wide viewing angle. In the case of liquid crystal, as a reflective liquid crystal or a transflective liquid crystal, when a liquid crystal panel is manufactured by sandwiching a liquid crystal between opposing substrates having transparent electrodes formed thereon as has been done in the past, a display element and a display device having a high display quality can be realized.

Embodiment 2

Figure 12:
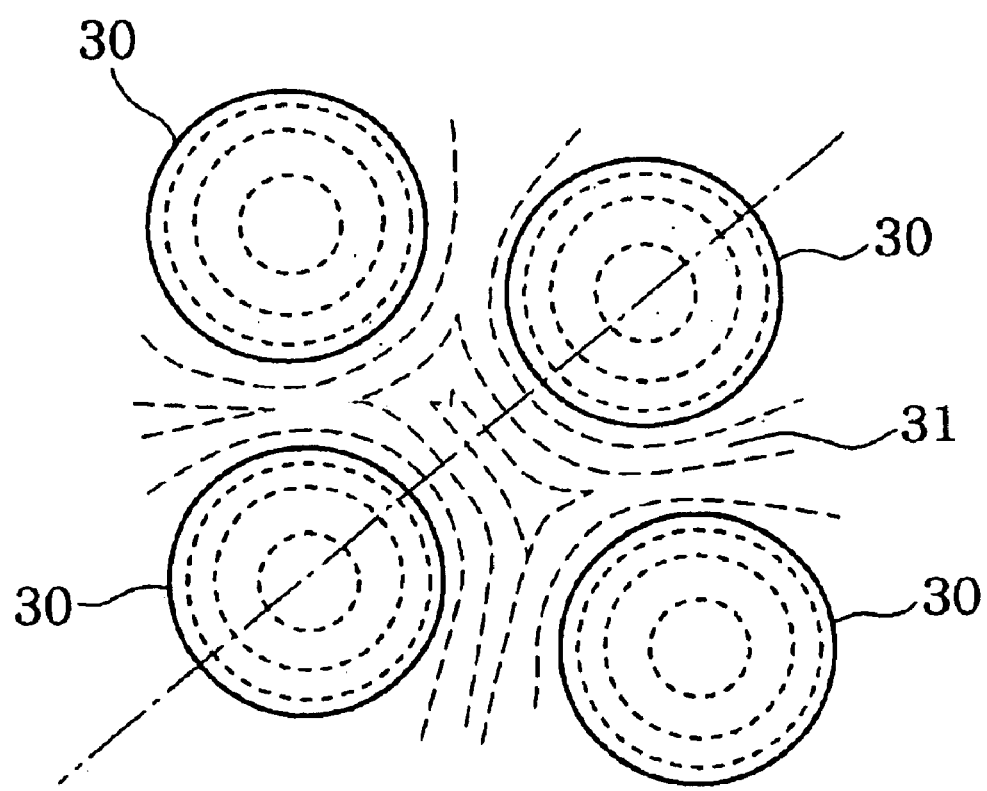
FIG. 12 is a plan view of a reflector of the present invention.

FIG. 12 is a plan view of a reflector of Embodiment 2 of the present invention. Such a reflector was fabricated as follows.

Figure 13:
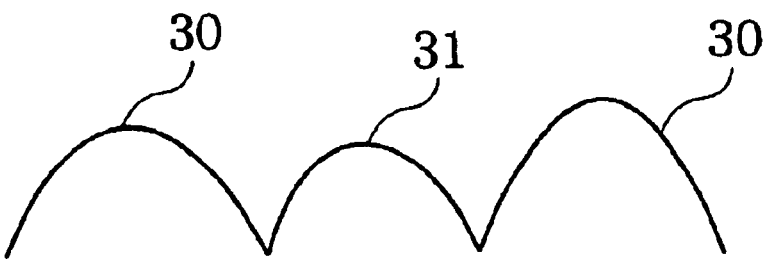
FIG. 13 is a plan view of a reflector of the present invention.

First, on a substrate, a first acrylic positive resist film was photolithographically patterned to form circular protrusions 30, and the protrusions were melted with heat to round the vertexes. When a second resist film was subsequently coated over the protrusions and was exposed/developed using a mask having a pattern that is the positive-negative inverse of the first resist film formed therein, the resist was left on portions other than the round protrusions. By rounding the resist with heat to form second protrusions 31 in the same manner as that of the first film, the cross section became such that adjacent protrusions were close to one another and flat portions at the foot of each protrusion were substantially eliminated, whereby the cross section took on a shape having an inclination angle formed at each boundary that varied discontinuously, as shown in FIG. 13.

Note that the first and the second resist films had a thickness of 0.8 μm and the diameter of each of the circular protrusions was about 6 μm.

Experiment

Over the above-mentioned depressions and protrusions, an aluminum reflecting film was deposited to a thickness of 200 nm to form a reflector, and then the diffuse reflection characteristics of the reflector was measured. The results are shown in FIG. 5 that was previously discussed. It is to be noted that the methods of carrying out the experiment and the measurement are similar to those of Experiment 1 in Embodiment 1.

As is apparent from FIG. 5, the diffuse reflection characteristics of a reflector of the present invention that is represented by a solid line 11 shows a higher intensity of exiting light at an angle of about 0 degree in comparison with the characteristic curve 9 of the conventional reflector, and thereby the reflector of the present invention proved to be capable of improving viewing angle as well as brightness.

Embodiment 3

Figure 14:
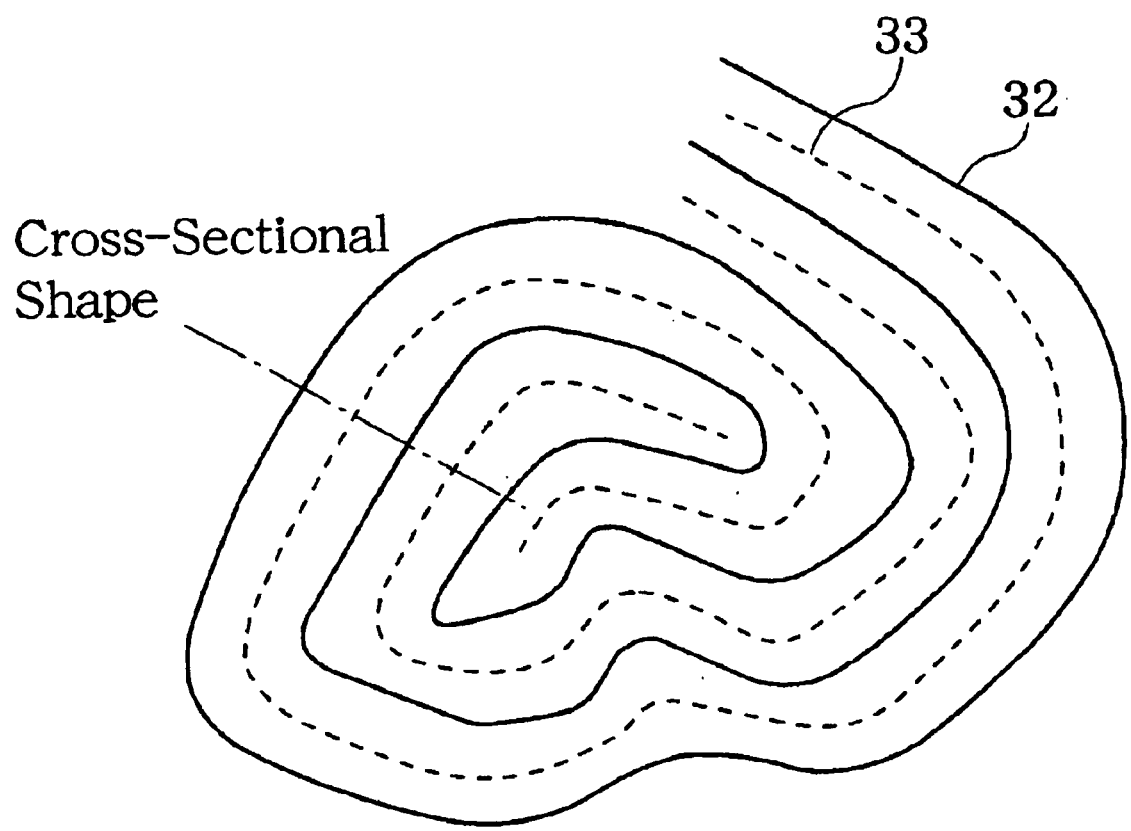
FIG. 14 is a plan view of a second reflector of the present invention.

A plan view of a second reflector of the present invention is shown in FIG. 14. In FIG. 14, a solid line 32 represents the ridge portion of ribbed depressions and protrusions and a broken line 33 represents a valley portion. As shown in FIG. 14, the lines representing the ribbed depressions and protrusions point in various directions as in a fingerprint, and the distance between the ridges is 10±1 μm. The distance varies by small amounts depending on the spot, and this serves to prevent the appearance of interference colors.

According to Sugiura et al. referred to in Background Art, the ribbed depressions and protrusions whose cross section is a quadratic curve were formed in one direction, and thus scattering occurred only in one direction. In consideration of this, in Embodiment 3, the ribbed depressions and protrusions were curved into the shape of a fingerprint in order to resolve the direction dependency. However, when such a ribbed pattern was formed using the method disclosed in Japanese Unexamined Patent Publication No. 6-27481 that was referred to in Background Art, though the cross-sectional shape was like that of a quadratic curve, the reflection characteristic was a triangle type resembling the characteristic curve 11 of FIG. 5, a characteristic having high angle dependency.

Experiment

In consideration of the above, from the cross-sectional shape of the ribbed depressions and protrusions that are whorl-shaped, shape models each slightly different were formed using a cutting process, and the reflection characteristics were observed.

As a result, it became clear that when Equation 2 is curve fitted, where z represents the thickness direction and x represents the horizontal direction from the extreme values of the cross-sectional shape of each protrusion or depression, and α and β represent constants, the reflection characteristic is a window type characteristic in the case of a=3. As the value of the "a" increases from 3 to 4, the characteristic is transformed from the window type into the triangle type. In the case of a=2, that is, when the inclination is linear, the scattering angle becomes extremely small, but the scattering angle can be substantially controlled by providing a distribution in inclination in accordance with position, and therefore it is possible to obtain a characteristic similar to the window type characteristic. However, it was found that when the value of the "a" exceeds 3, no improvement can be realized by providing a distribution.

For the reason described above, in the case of ribbed depressions and protrusions with little direction dependency that are curved so as to form a curved line, when the cross-sectional shapes are made similar to one another, a preferable characteristic, the window type characteristic, can be realized when the value of the "a" in Equation 2 is from about 2 to 3.

It should be noted that in cases where the ribbed depressions and protrusions are mixed with discontinuous cone-like depressions or protrusions such as those of Embodiment 2, it is preferable to set the value of the "a" in Equation 2 in the range of 3 to 4 for the ridged depressions and protrusions in accordance with the mixing ratio.

Method of Producing a Reflector

Although a cutting process was employed to form the models in consideration of the shapes, the following method involving a photolithography process was employed in order to realize mass production of actual reflectors.

Figure 15:
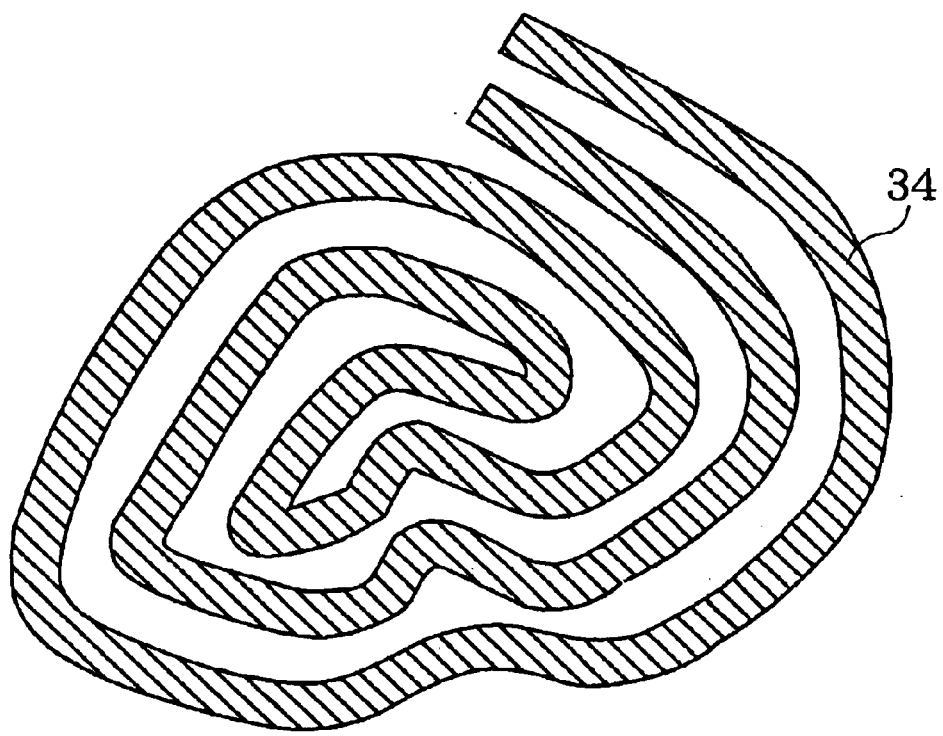
FIG. 15 is a schematic view illustrating a mask employed in a method of producing a reflector of the present invention.

As in the past, shape approximates a quadratic curve-type with melting by heat. Therefore, as shown in FIG. 15, by using a mask on which a curved light-shielding pattern 34 corresponding to the valleys of the ribs is formed, a positive resist coated on the substrate to a thickness of 0.6 μm was subjected to a proximity exposure. The line width and spaces of the light-shielding pattern were 3 ∞m, and the proximity gap was 50 μm. With such a gap, due to diffraction, a realizable resolution by photolithography was approximately 5 μm. Because the resolution of the light-shielding pattern of FIG. 15 fell under the resolution limit, the mask image was blurred and the pattern that resulted from the development had a shape close to that of a solid line 35 of FIG. 16 where x is raised to the 3/2th power (see Equation 2 described above). For the sake of comparison, a curve 36 where $z=x^2$ is shown by a dashed line, and it became clear that the curve where x is to the 3/2th power has a shape between a line and a quadratic curve. Subsequently, the above resist was polymerized at a temperature of 200° C. and further an aluminum film was deposited, and as a result, a reflector having a window type characteristic nearly identical to that of Embodiment 1 was obtained.

A reflective liquid crystal display element fabricated by sealing together such a reflector and a counter substrate is capable of bright, wide-angle, and high quality displays that may be perceived the way a sheet of paper is; therefore, a display device having excellent display characteristics is realized.

Figure 16:
FIG. 16 is a cross-sectional view of a second reflector of the present invention.
Figure 20:
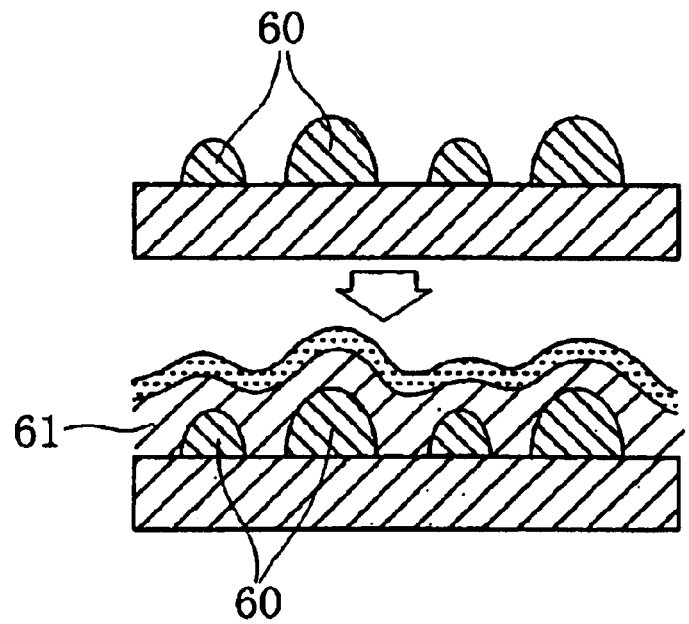
FIG. 20 is a cross-sectional view of a prior-art reflector.
Figure 21:
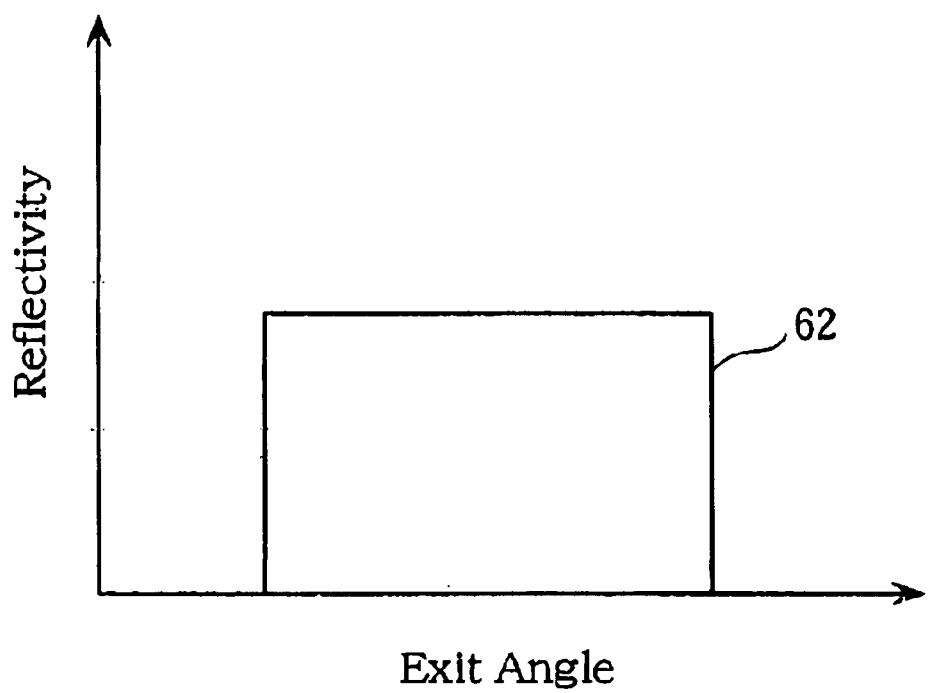
FIG. 21 is a graph illustrating preferable diffuse reflection characteristics.
Figure 22:
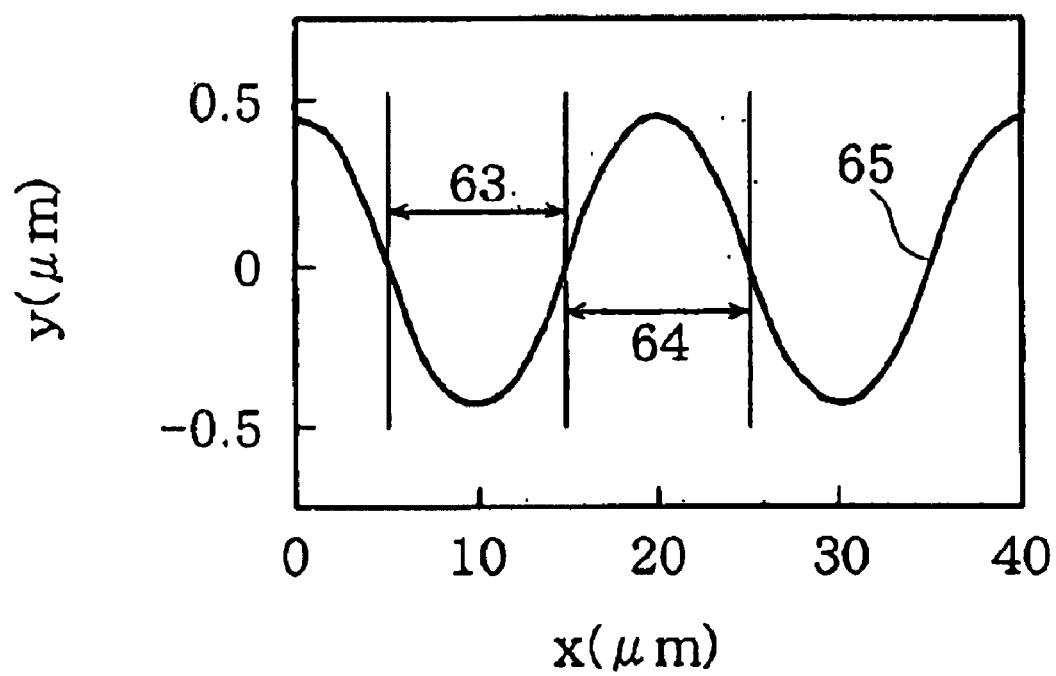
FIG. 22 is a cross-sectional view of a prior-art reflector.

It became evident from simulation that even when a reflector has a shape other than the ribbed one as described above and has a shape comprising a continuous curved surface as shown in FIG. 3, it is possible to achieve the window type characteristic, as long as the degree of the cross-sectional shape decreases from that of a quadratic surface to that of a curved surface with a power of 3/2 forming a line like the solid line 35 of FIG. 16. It was observed that the degree is not strictly limited to 3/2, and as long as the value of the "a" in Equation 2 is in the range of 2.5 to 3.5, it is possible to obtain a characteristic more similar to the window type characteristic in comparison that has been obtained in the past.

Embodiment 4

Though Embodiments 1 to 3 discuss a reflective liquid crystal, Embodiment 4 discusses a transflective liquid crystal display element having the window type scattering characteristic. FIG. 17 is a cross-sectional view showing a transflective liquid crystal display element of Embodiment 4 of the present invention. Depressions and protrusions may be similar to the conventional ones shown in FIG. 3. A reflecting film 38 is formed only on the protrusion surfaces 37 each having a vertex of the depressions and protrusions, and the reflecting film 38 is removed from the surrounding portions to make the surrounding portions light-transmissive. Over this, a transparent electrode 39 made of ITO was subsequently formed. Since the reflection characteristic applies only to the protrusion portions having the reflecting film, and not to the surrounding portions, it is possible to improve the reflection characteristic to be close to the window type scattering characteristic having a wide viewing angle. The substrate and counter substrate 41 are sealed together with a liquid crystal 40 sandwiched therebetween, and then polarizers 42a and 42b each provided with a retardation film are attached to the front and the back surfaces, respectively. A transflective liquid crystal panel 43 is thus fabricated.

In the transflective liquid crystal display element fabricated using the method described above, the transmitted light from a backlight 44 passes through portions on which no reflecting film is formed, thereby permitting display in dark conditions.

Figure 8:
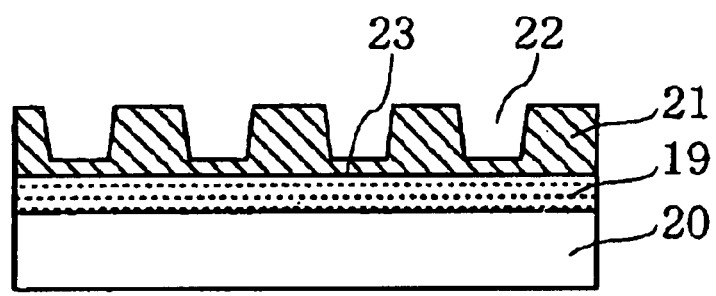
FIG. 8(a)–FIG. 8(e) are views showing the steps of a method of producing a reflector of the present invention.
Figure 8:
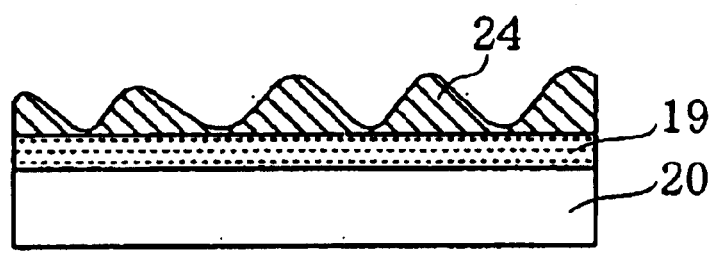
Figure 8:
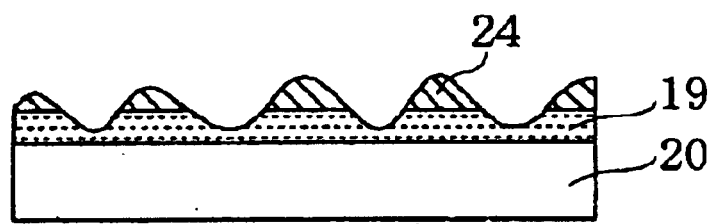
Figure 8:
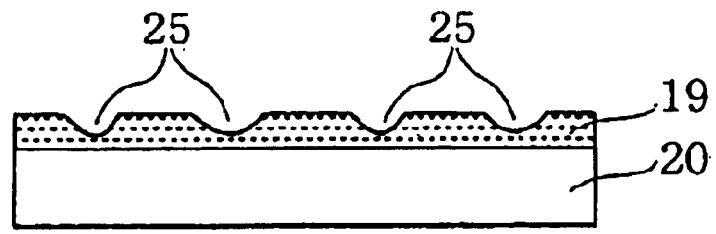
Figure 8:
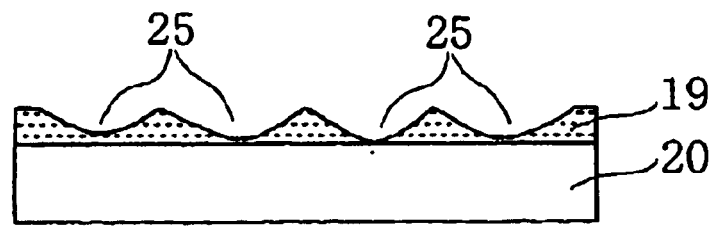

It should be noted that the shape having depressions and protrusions is not limited to the conventional continuous quadratic surfaces of FIG. 3 and may be such that the surrounding portions are narrow as shown in FIG. 8 and FIG. 9, but it is necessary in both cases to leave the reflecting film only on the convex-up and convex-down quadratic surface portions having the vertexes and to make the rest of the portions light-transmissive. With such a configuration, a transflective liquid crystal element having a diffuse reflection characteristic with brightness and a wide viewing angle is realized.

Embodiment 5

Embodiment 5 relates to a resin film with which a reflector having depressions and protrusions of the present invention can be fabricated at low cost, a production method thereof, and a method of producing a reflector by using the resin film. FIG. 18 shows views illustrating the steps of the method of producing a resin film and a reflector using the resin film in accordance with the present invention.

First, as shown in FIG. 18(*a*), a die 46 having a roll shape and having depressions and protrusions inscribed thereon is stamped onto one of the surfaces of a base film 45 (thickness is 50 $\mu$m) made of polyethylene terephthalate (PET) to form a plurality of depressions and protrusions. It is preferable that these depressions and protrusions be suitable for a diffuse reflector, that is, that inclination angle of these depressions and protrusions for providing a moderate amount of diffuse reflection be such that the maximum inclination angle of the depressions and protrusions is in the range of 2° to 15°, and more preferably, in the range of 4° to 11°. It is most preferred to employ a shape where the depressions and protrusions of Embodiments 1 to 4 are inverted so that the diffuse reflection characteristic is the window type scattering characteristic. Further to prevent scattering reflected light from being colored due to diffraction effect, it is necessary to arrange the protrusions irregularly or arrange them linearly and irregularly in position. Subsequently, as shown in FIG. 18(*b*), a photosensitive resin 47 is coated on the base film having the depressions and protrusions formed thereon to a thickness of about several micrometers by a slit coater, and after covering the base film with a protective sheet, a resin film 48 (dry film resist) that is curled into a roll-shape is fabricated. As shown in FIG. 18(*c*), after the above-described resin film is laminated over a driving substrate 49 for use in a display panel including TFT devices by an ordinary method, the base film 45 having formed thereon the depressions and protrusions suitable for a reflector is removed such that the photosensitive resin layer 47 is formed on a surface of the driving substrate 49.

Next, by photolithographycally forming a contact hole 47*h* in the photosensitive resin that is on a TFT device as shown in FIG. 18(*d*), and further by forming a reflective electrode 50 made of an aluminum alloy as shown in FIG. 18(*e*), the TFT and the reflective electrode are electrically connected.

As discussed above, according to the present Embodiment 5, the depressions and protrusions suitable for a reflector can be fabricated on a substrate by laminating a resin film in which depressions and protrusions have been formed in a base film with a molding tool.

Moreover, since the number of processing steps involved in the driving substrate for use in a display panel does not increase as has been the case in the past, the manufacturing cost is remarkably decreased. This is because the driving substrate, having undergone a number of processing steps, is a high-value-added product, and hence, when the step of forming the depressions and protrusions for a reflector is omitted, for example, losses caused by a decrease in a yield are reduced.

It should be noted that when a photosensitive resin is employed as the resin, the formation of the contact hole is facilitated.

INDUSTRIAL APPLICABILITY

In a reflector and a liquid crystal display element of the present invention, bright displays with a wide viewing angle and paper white displays without a sense of metallicity are realized. In addition, such a useful reflector and a liquid crystal display element is easily produced, and thus the value to industry is great.

What is claimed is:

1. A reflector comprising a reflecting film formed on a surface having depressions and protrusions wherein:

each of the depressions and protrusions has a vertex and comprises a curved surface formed so as to be convex up or convex down and a surrounding portion including a valley or a ridge surrounding the curved surface with an inflection point of the curved surface serving as a boundary between the curved surface and the surrounding portion;

when the curved surface is convex up, the inflection point is on the valley side of the midpoint between the vertex and the valley, whereas when the curved surface is convex down, the inflection point is on the ridge side of the midpoint between the vertex and the ridge; and wherein cross-sectional shapes of the curved surfaces located on the surface having the reflecting film are made similar by defining the cross-sectional shapes by $z=\alpha x^{a/2}+\beta$, where z is the height or depth of the depression or protrusion in the thickness direction, x is a coordinate along a linear line orthogonal to said z along the thickness direction and including a peak of the depression or protrusion in the horizontal direction, $\alpha$ and $\beta$ are constants, and the average value of "a" for the protrusions is greater than 2 and not greater than 4.

2. The reflector according to claim 1, wherein each curved surface has a width two or more times the width of the surrounding portion.

3. The reflector according to claim 2, wherein the average value of "a" is greater than 2 and equal to or less than 3 and the intensity of reflected light that is reflected by the reflector is such that light in a direction of specular reflection of incident light has a higher intensity than diffusely reflected light in a direction of scattering of incident light at a specified reflection angle.

4. The reflector according to claim 1, wherein adjacent convex up or convex down curved surfaces are close to one another and there are substantially no surrounding portions.

5. The reflector according to claim 4, wherein the shape having depressions and protrusions comprises only either convex up or convex down curved surfaces and the sign of the slope of inclined surfaces of adjacent protrusions is reversed at every boundary between the depressions or protrusions.

6. The display element comprising a reflector according to claim 1.

7. The display element according to claim 6, further comprising a liquid crystal layer.

8. The display device comprising a display element according to claim 7.

9. The reflector according to claim 1, wherein a scattering characteristic is flat.

10. The reflector according to claim 1, wherein, when cross-sectional shapes of the curved surfaces are made similar by defining the cross-sectional shapes by $z=\alpha x^{a/2}+\beta$, where z is the height or depth of the depression or protrusion in the thickness direction, x is a coordinate along a linear line orthogonal to said z along the thickness direction and including a peak of the depression or protrusion in the horizontal direction, and $\alpha$ and $\beta$ are constants, the average value of "a" for the protrusions is greater than 2 and not greater than 3, and wherein the intensity of reflected light that is reflected by the reflector is such that light in a direction of specular reflection of incident light has a higher intensity than diffusely reflected light in a direction of scattering of incident light at a specified reflection angle.

11. A resin film wherein a photosensitive resin layer is coated on a base film having a surface with a plurality of protrusions or depressions each having a curved-like surface; the average value for a maximum inclination angle of each of the plurality of protrusions or depressions being not less than 4° and not more than 11° when said protrusions or depressions cause scattering.

12. A resin film comprising a photosensitive resin layer on a base film having a surface located between the base film and the photosensitive resin with a plurality of protrusions or depressions each having a curved-like surface, wherein:

each of the protrusions or depressions comprises a convex up or convex down curved surface having a vertex and a surrounding portion including a ridge or a valley surrounding the curved surface with an inflection point of the curved surface serving as a boundary between the curved surface and the surrounding portion, and when the curved surface is convex up, the inflection point is on the valley side of the midpoint between the vertex point and the valley, whereas when the curved surface is convex down, the inflection point is on the ridge side of the midpoint between the vertex and the peak, and cross-sectional shapes of the curved surfaces located on the surface located between the base film and the photosensitive resin have cross-sectional shapes defined by $z=\alpha x^{a/2}+\beta$, where z is the height or depth of the depression or protrusion in the thickness direction, x is a coordinate along a linear line orthogonal to said z along the thickness direction and including a peak of the depression or protrusion in the horizontal direction, $\alpha$ and $\beta$ are constants, and the average value of "a" for the protrusions is greater than 2 and not greater than 4.

* * * * *

UNITED STATES PATENT AND TRADEMARK OFFICE
CERTIFICATE OF CORRECTION

PATENT NO. : 6,781,759 B1
DATED : August 24, 2004
INVENTOR(S) : Naohide Wakita et al.

It is certified that error appears in the above-identified patent and that said Letters Patent is hereby corrected as shown below:

Column 15,
Line 28, "when" should be -- and wherein --.

Column 16,
After line 27, add claims 13-15 as follows:

13. A liquid crystal display element comprising a substrate and a liquid crystal layer, the substrate having a plurality of convex-up or convex-down curved surfaces each having a vertex, a reflecting film on the convex curved surfaces, and no reflecting film on surrounding portions surrounding the convex curved surfaces, wherein:
cross-sectional shapes having vertexes of the convex curved surfaces as origins are made similar by defining the cross-sectional shapes by $z = \alpha x^{a/2} + \beta$, where $z$ is the thickness direction, $x$ is the horizontal direction, and $\alpha$ and $\beta$ are constants, the average value of "a" for the plurality of protrusions or depressions is fixed to be greater than 2 and equal to or less than 4.

14. A method of producing a reflector comprising the steps of:
forming a photoresist film having a plurality of holes on at least a portion of a substrate surface having pixel portions by photolithography; and
by substantially isotropically etching the substrate surface, forming depressions with a larger diameter than the holes in the holes on the substrate surface, so that a plurality of depressions adjacent to one another are made close.

UNITED STATES PATENT AND TRADEMARK OFFICE
CERTIFICATE OF CORRECTION

PATENT NO. : 6,781,759 B1
DATED : August 24, 2004
INVENTOR(S) : Naohide Wakita et al.

It is certified that error appears in the above-identified patent and that said Letters Patent is hereby corrected as shown below:

Column 16, (cont)

15. A method of producing a reflector comprising the steps of:
    forming a plurality of depressions each having a curved-like surface and being separated from one another on at least a portion of a substrate surface having pixel portions; and
    widening the diameter of each of the plurality of depressions until adjacent depressions are close to one another by substantially isotropically etching the substrate surface.

Signed and Sealed this

Fifth Day of April, 2005

JON W. DUDAS
*Director of the United States Patent and Trademark Office*